(12) United States Patent
Riquet et al.

(10) Patent No.: US 7,550,028 B2
(45) Date of Patent: Jun. 23, 2009

(54) METHOD FOR RECYCLING ALUMINUM-LITHIUM-TYPE ALLOY SCRAP

(75) Inventors: Jean-Pierre Riquet, Grenoble (FR); Philippe Pelmard, Moirans (FR); Jean-François Verdier, Issoire (FR)

(73) Assignee: Alcan Rhenalu, Paris (FR)

( * ) Notice: Subject to any disclaimer, the term of this patent is extended or adjusted under 35 U.S.C. 154(b) by 293 days.

(21) Appl. No.: 11/462,624

(22) Filed: Aug. 4, 2006

(65) Prior Publication Data

US 2007/0062336 A1 Mar. 22, 2007

(30) Foreign Application Priority Data

Aug. 4, 2005 (FR) .................................. 05 08336

(51) Int. Cl.
*C22B 21/00* (2006.01)
*C22B 7/00* (2006.01)
(52) U.S. Cl. ........................................ 75/687; 266/901
(58) Field of Classification Search ............... 75/687; 266/901
See application file for complete search history.

(56) References Cited

U.S. PATENT DOCUMENTS

| | | | | |
|---|---|---|---|---|
| 2,942,792 A | * | 6/1960 | Anderson et al. | 241/14 |
| 3,873,305 A | * | 3/1975 | Claxton et al. | 75/686 |
| 3,955,970 A | * | 5/1976 | Claxton et al. | 75/682 |
| 4,141,373 A | * | 2/1979 | Kartanson et al. | 75/403 |
| 4,200,262 A | * | 4/1980 | Evans et al. | 266/44 |
| 4,571,258 A | * | 2/1986 | Bamji et al. | 75/10.18 |
| 5,032,171 A | * | 7/1991 | Robare et al. | 75/10.18 |
| 5,060,871 A | * | 10/1991 | Brassinga et al. | 241/3 |
| 5,413,222 A | * | 5/1995 | Holder | 209/567 |

(Continued)

FOREIGN PATENT DOCUMENTS

| | | | |
|---|---|---|---|
| JP | 10-068037 | * | 3/1998 |
| JP | 10-147822 | | 6/1998 |

OTHER PUBLICATIONS

W.R. Wilson et al. Recycling of Aluminum-Lithium Process Scrap, Journal de Physique, Colloque C3, vol. 48, No. 9, 1987, p. C3-75-C3-83.*

(Continued)

*Primary Examiner*—George Wyszomierski
*Assistant Examiner*—Mark L Shevin
(74) *Attorney, Agent, or Firm*—Banner & Witcoff, Ltd.

(57) ABSTRACT

The present invention is directed to a method for melting scrap of an aluminum alloy containing lithium. The steps include providing scrap containing aluminum-lithium-type alloys, preparing an initial liquid metal bed of a first composition in a smelting oven, loading the scrap onto the initial liquid metal bed so as to create a floating layer of the scrap with a controlled thickness at the surface of the liquid metal bed, partially melting the floating layer via contact with the metal bed so as to obtain a liquid metal bath having a second composition, and removing the liquid metal from the second composition of the liquid metal bath. The method has technical and economic advantages. It does not require investment in a particular installation and it requires minimal use of expensive expendable materials such as inert gas, because the formation of a floating layer having a controlled thickness makes it possible to effectively protect the surface of the liquid metal from oxidation.

27 Claims, 1 Drawing Sheet

U.S. PATENT DOCUMENTS

| | | | |
|---|---|---|---|
| 5,415,220 A * | 5/1995 | Edwards | 164/473 |
| 6,293,990 B1 * | 9/2001 | Verdier et al. | 75/353 |
| 6,551,424 B1 * | 4/2003 | Haszler et al. | 148/552 |
| 2004/0244535 A1 * | 12/2004 | Austin | 75/687 |

OTHER PUBLICATIONS

D.V. Neff, Recycling of Nonferrous Alloys, in vol. 2 of ASM Handbook, 1997, 5 pages.*

EPA Final Report on Secondary Aluminum Operations, Jan. 1995, 12 pages.*

R.S. James, Aluminum-Lithium Alloys, in vol. 2 of ASM Handbook, 1997, 10 pages.*

J.A.S. Tenorio and D.C.R. Espinosa, Recycling of Aluminum, Ch. 4, vol. 2 of Handbook of Aluminum, eds. G.E. Totten and D.S. MacKenzie, 2003, 44 pages.*

* cited by examiner

METHOD FOR RECYCLING ALUMINUM-LITHIUM-TYPE ALLOY SCRAP

CROSS REFERENCE TO RELATED APPLICATIONS

This application claims priority to French Application No. 0508336 filed Aug. 4, 2005, incorporated herein by reference.

FIELD OF THE INVENTION

The invention relates to the production of lithium-containing aluminium alloy remelting ingots, based on scrap (raw materials for recycling, such as machine scraps or chips). The invention relates in particular to the recycling of scrap resulting from manufacturing methods in the aeronautics and space industries.

BACKGROUND OF THE INVENTION

In a number of industries, the methods for producing finished metal products by processes such as machining, transformation and cutting of intermediate products generate large amounts of machine scraps or chips. In this text, we refer to this waste with the term "scrap". The aeronautics and space industries in particular generate a large amount of scrap, because numerous aircraft components and structural parts are obtained by integral machining of massive parts. However, the scrap is often difficult to recycle directly due to the mixture with other alloys of aluminum or other materials used in aeronautics, such as stainless steel and titanium. The waste from machining of aeronautics alloys is thus, for example, recycled into aluminum-silicon alloys intended for molded products. This method of upgrading will hereinafter be referred to as the "usual stream". It results in a partial loss in the value of the metal.

It is also possible to produce products made of aluminum alloys, from scrap, intended for aeronautical and space applications. Patent FR 2801060 thus describes the production of products and semi-finished products in 7000 series alloys using raw materials for recycling, such as machine scraps or chips. This recycling is made possible by a step of purifying certain impurities. This method of upgrading will hereinafter be referred to as the "aeronautic stream".

The term "aluminum-lithium-type alloy" refers to any alloy containing an amount of lithium greater than 0.2% by weight and preferably greater than 0.5% by weight, regardless of the content of the other alloying elements. The common feature of this alloy family is the need for specific precautions associated with the oxidizability of lithium. Aluminum-lithium (Al—Li) alloys have a lower density than conventional aluminum alloys and are therefore highly beneficial for reducing the weight of aeronautical parts. However, Al—Li type alloys are significantly more expensive than products made of alloys not containing lithium, for three reasons: the intrinsic cost of lithium, the cost of development of the metal in foundry, and the difficulty of recycling the scrap. This invention relates to the recycling of the scrap of Al—Li type alloys, and in particular finely divided scrap. This scrap is generated not only during the production of structural elements from semi-finished products that are rolled, drawn or forged, but already in the aluminum plant itself, during the scalping of ingots for rolling or during the skinning of billets.

According to the prior art, only massive Al—Li type alloy waste is recycled, such as ingots for rolling, billets, rejected heavy plates or waste from cropping of heavy plates. With regard to finely divided scrap such as machine chips of an Al—Li type alloy, those skilled in the art tend to believe that the recycling of this scrap is not possible in industrial amounts. Thus, in the "usual stream", the presence of lithium may result in numerous problems. First, from a practical point of view when melting the scrap, lithium promotes oxidation of the liquid metal and consequences include the presence of fumes, the formation of thick crusts and possibly complete solidification of the melt. Second, lithium is a detrimental metal for many aluminum alloy applications, such as packaging (in which, for certain applications, the residual content of lithium should not exceed 0.0001%), or because the maximum allowable content of any impurity is 0.05% (Robare and Witters, Light Metals 1991, p. 1223). Similarly, in the "aeronautical stream", it is generally accepted (Wilson et al. Journal de Physique C-75 1987) that the recycling of Al—Li type alloy scrap in the same alloys is not possible under the quality conditions required by the industries that use these products, in particular the aeronautics and space industries.

In the prior art, the most common solution enabling the scrap of Al—Li type alloys to be recycled consists of using a method enabling aluminum to be separated from lithium (Wilson et al., Rabare and Witters). Thus, there are numerous patent applications relating to the purification of liquid mixtures of aluminum-lithium by electrolytic methods. Methods of this type are described in U.S. Pat. No. 4,780,186 (Alcoa), U.S. Pat. No. 4,790,917 (Alcan), U.S. Pat. No. 4,849,072 (Alcoa), U.S. Pat. No. 4,882,017 (Alcoa), U.S. Pat. No. 4,973,390 (Alcoa) and U.S. Pat. No. 5,071,523 (Alcoa). Other chemical-type solutions have also been proposed. FR 2600343 (Pechiney) proposes a method for recovering aluminum and lithium from metal waste by chlorination of lithium and recovery of the lithium chloride formed. Similarly, U.S. Pat. No. 4,758,316 (Alcoa) proposes a method for remelting and purifying Al—Li type alloy scrap, in particular by forming a LiCl salt by chlorination of the liquid metal. U.S. Pat. No. 5,032,171 (Alcoa) proposes a method for removing lithium in a molten aluminum-lithium alloy by the addition of a hydrofluoric acid salt and electromagnetic stirring.

According to the prior art, a large amount of the finely divided scrap of the Al—Li type alloys therefore leaves the aluminum industrial circuit for final use in external systems, for example, to deoxidize steel. This weighs heavily on the overall economy of Al—Li alloys and inhibits their economic development. This economic effect is further reinforced when Al—Li type alloys contain other expensive chemical elements, such as silver, scandium, rare earth metals, and copper. By way of example, the alloy AA 2195 contains between 0.8 and 1.2% lithium and between 0.25 and 0.6% silver, and the alloy AA 2098 contains between 0.8 and 1.3% Li and between 0.25 and 0.6% silver. In general, it is desirable to improve the rate of recycling of Al—Li type alloys.

The prior art describes methods for melting aluminum-alloy scrap in general. U.S. Pat. No. 3,999,980 describes a method for melting scrap in an inert atmosphere and compares it with typical methods using a molten salt. U.S. Pat. No. 4,159,907 shows the problems related to the low scrap density, which results in a tendency for the scrap to remain at the surface of liquid aluminum and to be oxidized, and proposes densifying the scrap by compression in order to overcome this problem. U.S. Pat. No. 6,074,455 describes a method for rapid immersion of scrap into the liquid aluminum by adding it to the vortex created by a rotor. U.S. Pat. No. 3,873,305 describes a melting process for container scrap in which scrap is rapidly melted by forced submergence in a moving stream. Japanese Patent No. 10147822 describes a furnace used for scrap remelting in which scrap is stirred above the melt with a specific apparatus. U.S. Patent Application 2004/0244535 proposes adding waste of Al—Li type alloys in densified form to a tundish suitable for achieving rapid immersion.

To melt scrap, it is therefore preferable, according to the prior art, to perform a rapid immersion or protection by an inert atmosphere or with molten salt so as to avoid oxidation of the scrap. For Al—Li type alloys, which are even more sensitive to oxidation than other aluminum alloys, a person skilled in the art will consider it necessary to push the methods of rapid immersion or protection by an inert atmosphere or with molten salt even further, and all the more so if finely divided scrap, i.e. having a high surface area, is used. It is thus mentioned in the prior art (D. Naser, Material Eng. 103(4) p. 48) that the problem of mixing Al—Li type alloy scrap during melting is unsolved and that special equipment is needed for melting this type of scrap.

A problem that this invention is intended to solve is therefore that of providing a novel approach to the production of aluminum-lithium-type alloy remelting ingots to enable a significant fraction of finely divided scrap to be incorporated.

SUMMARY OF THE INVENTION

The invention relates to a method for melting lithium-containing alloy scrap. The steps include providing scrap containing aluminum-lithium-type alloys, preparing an initial liquid metal bed of a first composition in a smelting oven, loading the scrap onto the initial liquid metal bed so as to create a floating layer of the scrap with a controlled thickness at the surface of the liquid metal bed, partially melting the floating layer via contact with the metal bed so as to obtain a liquid metal bath having a second composition, and removing the liquid metal from the liquid metal bath. The second composition can be the same as or different from the first composition. The lithium content of the metal bath having a second composition comprises between 0.1 wt. %, and preferably 0.2 wt. % to 2.5 wt. %.

A remelting ingot is obtained by the method according to the invention.

Intermediate products obtained by the method according to the invention can be used for the production of finished or semi-finished products in an Al—Li type alloy, such as thick plates, thin plates, strips, profiles or forged parts.

DETAILED DESCRIPTION OF EMBODIMENTS OF THE INVENTION

Figure 1:
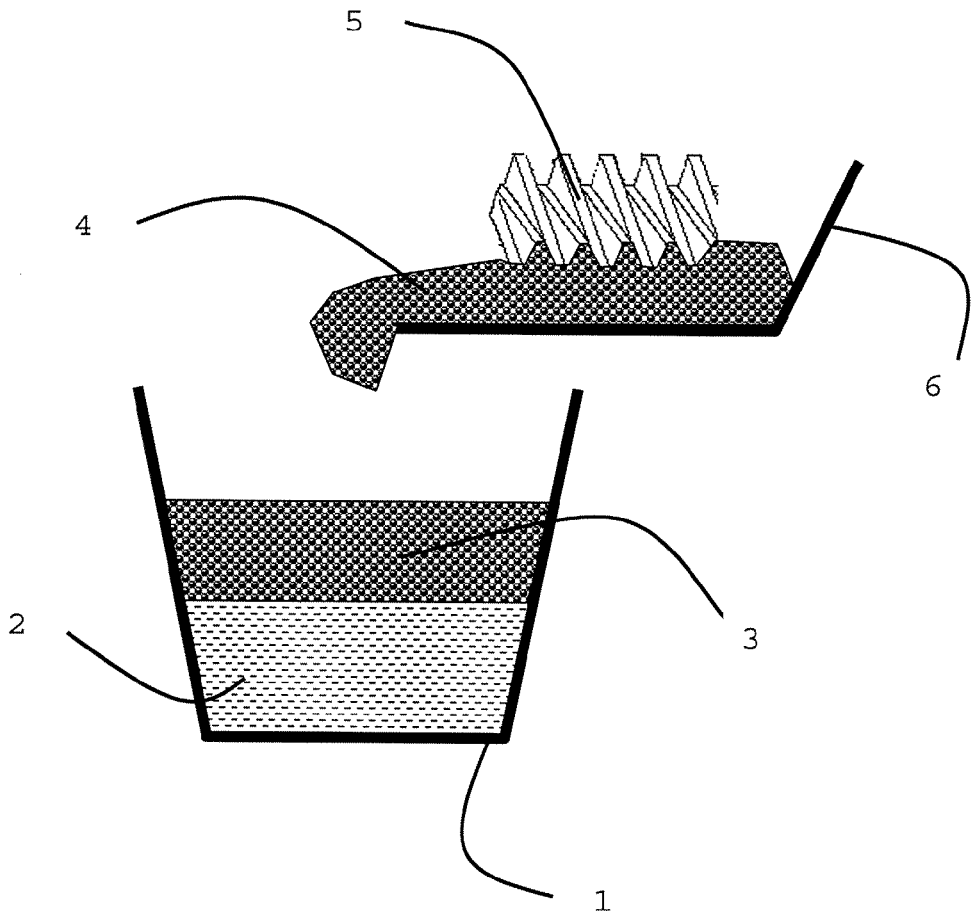
FIG. 1 shows schematically the principle of operation of the method according to the invention. The scrap 4 is inserted into the oven 1 using a worm 5, from a tank 6, and forms, at the surface of the liquid metal 2, a layer of scrap 3, which protects the surface of the liquid metal from oxidation.

Unless otherwise indicated, all indications concerning the chemical composition of the alloys are expressed in weight percentages. Consequently, in a mathematical expression, "0.4" Li means: 0.4 times the lithium content, expressed as a weight percentage; this applies accordingly to the other chemical elements. The designation of alloys follows the rules of The Aluminum Association, which are known to a person skilled in the art. The chemical composition of standardized aluminum alloys is defined, for example, in standard EN 573-3. Unless otherwise indicated, the definitions of the European standard EN 12258-1 are applied. The terms related to the scrap and the recycling thereof are described in standard EN 12258-3. The term "machining" includes any process of removing material such as turning, overhauling, boring, tapping, electrical discharge machining, grinding and polishing.

The method according to the invention includes three major steps: first, the supply of the scrap, second, the preparation of an initial liquid metal bed and the loading of the scrap, and third, the removal of the liquid metal and casting.

Supply of the Scrap

Scrap capable of being recycled by the method according to this invention can be provided in various forms, but comprises preferentially finely divided scrap, that is scrap consisting of elements in which at least one dimension among length, width and thickness is less than 1 mm and in which no dimension among length, width and thickness is greater than 30 mm. One of the forms especially preferred is referred to by the term "turnings" in standard EN 12258-3, which refers to scrap consisting of grains, chips, curls and flakes resulting from machining or other operations. The scrap capable of being recycled in the context of the invention can be provided in various states: primarily loose scrap and shredded scrap, and granulated scrap may possibly be used if it comprises small enough parts. The size characteristics of the scrap are important in the production of this invention. If the scrap is provided in compacted form, it is generally necessary to de-compact it.

The scrap that may be used in this invention is also characterized by its density. The density of the scrap is measured as follows: a cylindrical container with a capacity of 1 liter is filled with scrap and a vibration is produced in the form of small shocks so as to compact the scrap. The operation is repeated until the container is filled to the rim. The weight of the filled container, from which the weight of the empty container is subtracted, makes it possible to determine the density of the scrap. It is preferable for the density of the scrap to be at least 0.05 t/m$^3$ and preferably 0.1 to 0.7 t/m$^3$ (tons per cubic meter), and more advantageously between 0.2 to 0.4 t/m$^3$.

It is not necessary in this invention for the scrap to be in the "processed scrap" or "clean scrap" state, although "coated scrap" and "anodized scrap" are unsuitable for this method. Scrap consisting of larger elements, called "wrought scrap" and "scrap for direct melting" in standard EN 12258-3, are not used in the main context of this invention but may be used advantageously to prepare the initial liquid metal bed needed for this invention.

In general, the scrap is covered by lubricants that may be emulsions or whole oils, and which are referred to in this document by the general term "oil". The amount of oil present on the scrap varies according to the production step during which it is generated and the technology used to remove the metal. Thus, the amount of oil present on the scrap obtained during the operation of scalping of the ingots for rolling is generally low. However, the amount of oil present on the scrap coming from machining operations is much higher. Regardless of the amount of oil present on the scrap, this invention may be employed. A preliminary de-oiling step may possibly be necessary, or at least useful. It can be performed by any of the conventional chemical and/or thermal cleaning methods. In the case of chemical degreasing using an aqueous product, a drying step is necessary. An advantageous degreasing method consists of using a rotating cylindrical oven with a burner (such as the IDEX® type); the atmosphere of this type of oven contains little oxygen so as to prevent the oils from igniting. The oxygen content is controlled in this type of oven by a sensor and a control loop.

Advantageously, the scrap that is recycled consists essentially of Al—Li type alloys, preferably appropriately sorted. Suitable alloys are, for example, AA2050, AA2090, AA2091, AA2094, AA2095, AA2097, AA2098, AA2099, AA2195, AA2196, AA2197, AA2198, AA2199, AA2297 and AA2397, as defined by the Aluminum Association. The advantage of using sorted waste is that it prevents contamination of the welding pool by elements, such as zinc, that are not contained in most of the alloys, and therefore facilitates the subsequent use of the intermediate products obtained. Scrap containing silver or scandium can advantageously be used economically.

It is desirable for the scrap to not be too polluted with iron (Fe) and silicon (Si) by scrap not from aluminum alloys because this could eliminate certain desirable properties of the product, which may be developed from the recycled metal. The process according to the invention may comprise a step designed to reduce the quantity of ferrous waste. Any known sorting method can be used. The separation of ferrous metals is simple because it is possible to use magnetic sorting or eddy current sorting; this latter method is particularly suitable for the separation of magnetic waste (such as white metals and stainless steel) and non-magnetic waste (for example red metals, copper, and brass). Thus, it is possible to limit the Fe content of the scrap from ferrous alloy parts. It is possible to further improve the sorting of the scrap using a device based on the differences in particle size, density and/or electrical conductivity as described in U.S. Pat. No. 5,060,871.

To summarize, the supply step may comprise, depending on the initial composition of the scrap, the steps of: (a) selecting the alloys that make up the scrap;(b) de-compacting the scrap if it is in compacted form; (c) selecting the appropriate sizes of the pieces that make up the scrap; (d) removing any metal or non-metal impurities; and (e) de-oiling. These steps may of course be replaced by providing a scrap having well-defined characteristics.

Preparation of an Initial Liquid Metal Bed and Loading of the Scrap

The step of loading the scrap consists of inserting the scrap into the oven. It may be performed continuously or semi-continuously. The loading step is performed in a smelting oven in which an initial liquid metal bed of a first composition is prepared, onto which the non-compacted scrap is poured. The initial liquid metal bed is preferably obtained economically by melting large quantities of waste in a smelting oven, such as clippings or frames of thin or thick plates, plate profiles, or billets, wherein the waste consists of an Al—Li type alloy compatible with the scrap or an alloy not containing lithium, and preferably with minimal additional components such that the composition will not interfere with the final composition. The initial liquid metal bed can also be obtained by melting remelting ingots of an Al—Li type alloy compatible with the scrap or an alloy not containing lithium, and preferably with minimal additional components such that the composition will not interfere with the final composition.

It is also possible to obtain the initial liquid metal bed by direct melting of scrap, but this method is not economically favorable due to the significant burning of scrap during this operation if it is performed without any special precautions. It is possible to perform this direct melting of scrap in an appropriate inert atmosphere, although this may increase the investment cost and the operation costs of the method. In the case of successive castings, the initial liquid metal bed may advantageously consist of the residue of the previous casting, or heel. The initial liquid metal bed has a weight typically under 300% of the weight of the scrap to be melted and preferably under 150% of the weight of the scrap to be melted. It is preferable for its temperature to be substantially equal to the temperature for melting the massive wastes or remelting ingots.

The scrap is loaded onto the liquid metal bed by suitable means, for example a worm or a hopper and a vibrating system, so as to create, at the surface of the liquid metal bed, a floating layer of the scrap having a controlled thickness, the floating layer being partially melted by contact with the metal bed so as to obtain a liquid metal bath having a second composition, which can be the same as or different from the first composition, and the lithium content of the second composition of the metal bath being at least 0.1 wt. %, and preferably 0.2 wt. % to 2.5 wt. %. Advantageously, the controlled thickness is between 100 mm and 1500 mm and preferably higher than 300 mm.

The lithium content in the second composition of the liquid metal bath may be at least 0.1 wt. % and preferably between 0.2 wt. % to 2.5 wt. %. It is preferably no more than 2.5%, because beyond 2.5%, the protection by the floating layer is no longer sufficient, which can generate harmful fumes, cause faster deterioration of oven refractories, and lead to a lower lithium yield. Below 0.1 wt. % or even 0.2 wt. %, the reactivity of the lithium diluted in the aluminum bath is low, and no protection is needed. In an advantageous embodiment of the invention, the lithium content in the second composition of the liquid metal bath is between 0.5 wt. % to 2 wt. %.

FIG. 1 shows a device consisting of a worm 5 enabling the scrap 4 to be added to the liquid metal bed 2 so as to form a layer of chips 3. The size characteristics of the scrap, its density, the temperature of the liquid metal bed, and the characteristics of the oven used may have an influence on the rate at which the scrap 4 must be introduced so as to obtain a layer 3 having the desired thickness. The scrap flow rate is advantageously set so as to maintain the thickness of the floating layer at between 100 mm and 1500 mm during the main part of the loading step and advantageously substantially the entire loading step, wherein the scrap is progressively melted and incorporated into the liquid metal bed 2. The loading step can optionally be performed continuously or semi-continuously.

It has been surprisingly discovered that the floating layer thus formed at the surface of the liquid metal bed protects the bed adequately during the melting, thus preventing oxidation by the ambient air and limiting caloric losses of the bed. In a preferred embodiment, the floating layer is quasi-static, which means that it is not stirred or forced mechanically to be submerged in the liquid metal bed. A mechanical action on the floating layer is preferably avoided because it adversely affects the protective effect of the floating layer. Moreover, if a mechanical action on the floating layer is undertaken with tools comprising iron, there is a risk of polluting the liquid metal bed with iron which could adversely affect the targeted use in aeronautic industry. In an advantageous embodiment, no mechanical apparatus in contact with the floating layer is used during the loading step.

During the loading step, an additional protection of the scrap and the liquid metal against oxidation, using, for example, argon, nitrogen or a molten salt may be employed, although it is not essential. If the lithium content of the liquid metal bed is high, for example over 2 wt. %, this additional protection is advantageous. In an advantageous embodiment of the invention, the smelting oven used is an electromagnetic stirring, or induction, furnace.

Removal and Casting

The liquid metal bath of a second composition is removed from the smelting oven by any appropriate means such as, for example, tilting of the oven, suction, or movement of mobile walls. This removal step can optionally be performed continuously or semi-continuously. In a continuous alternative of the invention, the steps of loading of the scrap and removal of the liquid metal are performed at least partially simultaneously. In this case, it is necessary for the liquid metal to be continuously covered by the floating scrap layer. In an advantageous embodiment of this continuous alternative, protection against oxidation of the scrap and the liquid metal by argon, nitrogen or a molten salt is used during the at least partially simultaneous steps of loading, melting of the layer and removal of the liquid metal.

Casting of the liquid metal removed is performed so as to form one or more solid intermediate products such as rolling ingots, extrusion billets, forging blocks or remelting ingots. Casting in the form of remelting ingots (as defined in standard EN 12258-1): "pigs", "ingots", "T-bars", "sows", or any other format favorable for subsequent melting is advantageous. No particular measure for protecting the surface of the liquid metal being removed from the oven to prevent oxidation is necessary during the removal step and during casting, if the time of exposure of the liquid metal to the ambient atmosphere is short.

The resulting intermediate product is cooled and unmolded under the usual operating conditions used by a person skilled in the art for this type of alloy. In an advantageous embodiment of the invention, the resulting intermediate product is a remelting ingot. The remelting ingot obtained preferably has a lithium content of between 0.1 wt % to 2.5 wt. %, and preferably between 0.2 wt. % to 2 wt. %. The remelting ingots obtained according to the invention can advantageously be used for the production of finished or semi-finished products in an Al—Li type alloy such as thick plates, thin plates, strips, profiles or forged parts.

It has also been observed that when the scrap contains precious metals, such as silver and/or scandium, the efficiency of recovery of these metals is very favorable.

Optional Step of Final Melting of the Floating Layer

In one embodiment of the invention, the floating layer is substantially totally melted, and the temperature of the liquid metal is advantageously adjusted after the loading step is completed so as to allow for removal of the liquid metal. In an advantageous embodiment of the invention, the step of final melting the layer is performed in an atmosphere protecting against oxidation; this protection is achieved, for example by liquid argon or the injection of gaseous argon. Other inert gases, for example nitrogen, may also be used In another embodiment of the invention, in the step of final melting of the layer, a molten salt, such as KCl, LiCl, $MgCl_2$ or a mixture of these salts is used, to which it is optionally possible to add $AlF_3$, cryolite ($AlF_6Na_3$), chiolite ($Na5Al_3F_{14}$) or any other appropriate salt, so as to protect the surface of the liquid metal from oxidation. If the lithium content of the bath is high, for example over 2 wt. %, this protection during the temperature adjustment step is particularly advantageous.

The method according to the invention has technical and economic advantages. The method does not require investment in a particular installation, in particular with an inert atmosphere and requires minimal use, if any, of expensive expendable materials such as inert gas. The formation of a floating layer having a controlled thickness makes it possible to protect the surface of the liquid metal from oxidation in a surprisingly effective manner. If the alloy contains precious metals other than silver and/or scandium, the method is particularly advantageous from an economical point of view because it enables these precious metals to be recovered in their entirety. This method thus shows significant progress with respect to the prior art, in which rapid immersion of the scrap is performed and/or in which expensive protection of the Al—Li type alloy scrap is performed so as to limit the oxidation of the scrap and the technical and economical consequences thereof.

EXAMPLES

Example 1

Two tons of scalping chips ("scrap") of alloy 2098 were inserted using a worm into an IDEX® oven so as to be degreased. This scrap was characterized as having a density of 0.3 t/m³. A magnetic sensor was used at the inlet of this oven so as to minimize accidental magnetic pollution.

In an induction furnace with a power supply current frequency of 70 Hz and with a capacity of 6 tons, a liquid metal bed was prepared from 3 tons of massive waste of alloy 2098. (For other similar trials of melting and successive casting operations, the residue of the previous casting, or heel, was used as the liquid metal bed. This liquid metal bed was brought to a temperature of between 700 and 780° C. Two tons of scrap were then added at a rate of 6 tons/hour. A floating layer with a stationary thickness of 800 mm was obtained. Argon was added during this loading step for certain trials. The conditions of all of the trials are summarized in Table 1. When the scrap was entirely loaded, protection of the surface of the liquid metal in the form of salts or argon was provided in some of these trials.

The salts used consisted of a mixture of 50% KCl and 50% LiCl. The temperature of the liquid metal was then set to 730 or 750° C., depending on the trial. The set point temperature and the temperature obtained are reported in Table 1. A casting of 2 tons of liquid metal was then performed, distributed between two bowls with a capacity of one ton each. Samples intended for the analyses ("casting slugs") were removed after the step of introduction of the scrap and at the time of the casting into the bowls.

TABLE 1

Operating conditions

| | Loading step | | | | Floating layer final melting step | | |
|---|---|---|---|---|---|---|---|
| Trial no. | Density of the scrap (t/m³) | Operating conditions | Scrap loading rate (tons/hour) | Thickness of the floating layer (mm) | Operating conditions | Set point temp.(° C.) | Temperature reached (° C.) |
| 1 | 0.3 | Argon | 6 | 800 | Argon | 730 | Not determined |
| 2 | 0.3 | Argon | 6 | 800 | Salt | 730 | 731 |
| 3 | 0.3 | — | 6 | 800 | — | 730 | 697 |
| 4 | 0.3 | — | 6 | 800 | Argon | 750 | 753 |

The results of the analyses of the slugs sampled at the time of the casting, obtained for the different trials, are provided in Table 2. Pollution with manganese and zinc from alloys 2024 and 7075, which polluted the scrap of 2098, were observed. A numeric correction associated with this pollution was performed so as to obtain the lithium yield by determining, using the zinc and manganese contents, the amount of scrap from alloys 2024 and 7075.

TABLE 2

Analytical results and yield

| | | | | | | % calculated | | | |
|---|---|---|---|---|---|---|---|---|---|
| Trial no. | % Li of the load (theoretical) | Weight % measured during casting | | | | % pollution | Li outside of pollution | Ag outside of pollution | Li yield |
| | | Li | Ag | Mn | Zn | | | | |
| 1 | 0.94 | 0.86 | 0.31 | 0.06 | 0.003 | 9.3 | 0.95 | 0.34 | 101% |
| 2 | 0.97 | 0.85 | 0.31 | 0.07 | 0.020 | 11.2 | 0.96 | 0.35 | 99% |
| 3 | 0.97 | 0.88 | 0.31 | 0.03 | 0.009 | 2.9 | 0.91 | 0.32 | 94% |
| 4 | 0.94 | 0.88 | 0.32 | 0.03 | 0.030 | 3.9 | 0.91 | 0.33 | 97% |

Contrary to expectations, the lithium yield is very similar for all of the experimental configurations used. Thus, in Trial No. 3, in which no particular protection beyond that provided by the floating layer during the loading or increase in temperature was performed, the Li yield is entirely acceptable for an industrial operation. It is also noted that the recovery of silver is good (the initial theoretical Ag content is on the order of 0.3% by weight). This makes the method even more attractive from an economic perspective. To optimize the economic efficiency of the method, the dross floating on the surface after unmolding contains metal in metallic form, which can be recovered by an additional operation.

Example 2

Figure 2:
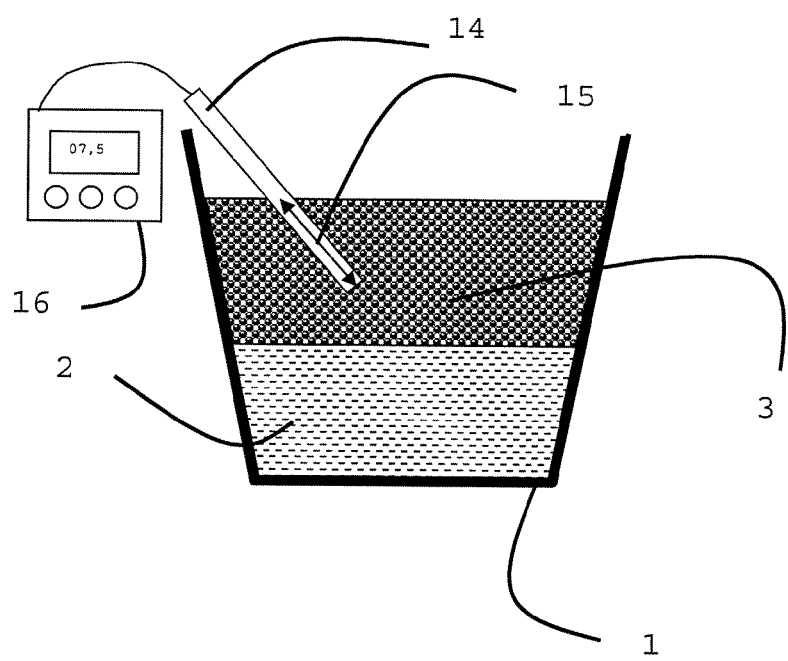
FIG. 2 illustrates the device used to measure the oxygen content inside the floating layer 3. A sampling probe 14 is inserted to a depth 15 in the floating layer 3, and the composition of the gas sampled locally is measured using a gas analyzer 16.

To better understand the protective effect of the floating layer above the liquid metal in the invention, measurements were undertaken of the oxygen levels within the floating layer using a sensor and a specialized apparatus. FIG. 2 diagrammatically shows the methodology implemented. A gas sampling probe 14 was inserted into the floating layer 3 to a predetermined depth 15. The oxygen content was measured using a gas analyzer 16 at a predetermined time, t1, after insertion. This time after insertion may influence the result of the measurement because the insertion of the probe into the floating layer locally disturbs the composition of the atmosphere. The results obtained are shown in Table 3. It is noted that an effect on the oxygen content can be observed for an insertion of the probe to a depth of 50 mm. For an insertion to a depth of 120 cm and a time after insertion of 7 min, an oxygen content diminished by a factor greater than 3 can be reached. These measurements show the effect of the floating layer on the local oxygen content.

TABLE 3

Results of the oxygen content measurements.

| | Weight of residue before scrap loading | Depth of insertion (5) | | | | | | | | |
|---|---|---|---|---|---|---|---|---|---|---|
| | | 120 mm | | 100 mm | | 60 mm | | 50 mm | | 30 mm | |
| Trial number | | O₂ content | t1 (min) | O₂ content | t1 (min) | O₂ content | t1 (min) | O₂ content | t1 (min) | O₂ content | t1 (min) |
| 1 | 2.5 | 15.3% 15.9% | 1 8 | 18.2% | 2 | 18.4% | 4 | 15.0% | 5 | 18.6% | 7 |

TABLE 3-continued

Results of the oxygen content measurements.

| Trial number | Weight of residue before scrap loading | Depth of insertion (5) | | | | | | | | |
|---|---|---|---|---|---|---|---|---|---|---|
| | | 120 mm | | 100 mm | | 60 mm | | 50 mm | | 30 mm | |
| | | $O_2$ content | t1 (min) | $O_2$ content | t1 (min) | $O_2$ content | t1 (min) | $O_2$ content | t1 (min) | $O_2$ content | t1 (min) |
| 2 | 3.5 | 16.3% 6.5% | 2 7 | 12.1% | 3 | 17.5% | 4 | 19.5% | 5 | 20.5% | 6 |

What is claimed is:

1. A method for melting scrap of an aluminum alloy containing lithium, comprising:
   (i) providing scrap containing aluminum-lithium-type alloys;
   (ii) preparing an initial liquid metal bed of a first composition in a smelting oven;
   (iii) loading the scrap onto the initial liquid metal bed so as to create, at the surface of the liquid metal bed, a floating layer of the scrap with a controlled thickness of between 300 mm and 1500 mm, the floating layer preventing oxidation of the liquid metal bed by the ambient air, the floating layer being partially melted by contact with the metal bed so as to obtain a liquid metal bath having a second composition, which can be the same as or different from the first composition, a lithium content of the second composition of the metal bath being between 0.1 wt. % to 2.5 wt. %; and
   (iv) removing the liquid metal from the second composition of the liquid metal bath.

2. The method according to claim 1, wherein the loading and removal steps are performed at least partially simultaneously, and the liquid metal is constantly covered by the floating layer.

3. The method according to claim 2, wherein the loading step is performed continuously or semi-continuously.

4. The method according to claim 2, wherein the removal step is performed continuously or semi-continuously.

5. The method according to claim 1, wherein after the loading step is completed, the floating layer is substantially totally melted.

6. The method according to claim 5, wherein the temperature of the second composition of the liquid metal bath with the second composition is adjusted so as to obtain a temperature compatible with the removal of liquid metal during the removal step.

7. The method according to claim 5, wherein the scrap and the liquid metal are protected against oxidation by liquid argon, gaseous argon, nitrogen, or a combination thereof during the step of final melting of the floating layer.

8. The method according to claim 5, wherein the scrap and the liquid metal are protected against oxidation by a molten salt during the step of final melting of the floating layer.

9. The method according to claim 8, wherein the molten salt comprises one or more of the salts selected from the group consisting of KCl, LiCl, $MgCl_2$, $AlF_3$, $AlF_6Na_3$ and $Na_5Al_3F_{14}$ and combinations thereof.

10. The method according to claim 1, wherein the liquid metal removed is cast to form a solid intermediate product.

11. The method according to claim 1, wherein the lithium content of the second composition of the liquid metal bath is between 0.5 % and 2 % by weight.

12. The method according to claim 1, wherein the floating layer and the liquid metal bath are protected against oxidation during the loading step by argon, nitrogen, a molten salt, or a combination thereof.

13. The method according to claim 1, wherein the scrap is constituted by turnings such as grains, chips or wool produced by machining or other operations.

14. The method according to claim 1, wherein the scrap comprises elements of which at least one dimension among length, width and thickness is less than 1 mm and of which no dimension among length, width and thickness is greater than 30 mm.

15. The method according to claim 1, wherein the density of the scrap is between 0.05 $t/m^3$ and 0.7 $t/m^3$.

16. The method according to claim 15, wherein the density of the scrap is between 0.2 and 0.4 $t/m^3$.

17. The method according to claim 1, wherein the scrap consists essentially of one or more alloys selected from the group consisting of AA2050, AA2090, AA2091, AA2094, AA2095, AA2097, AA2098, AA2099, AA2195, AA2196, AA2197, AA2198, AA2199, AA2297 and AA2397.

18. The method according to claim 1, wherein the scrap includes silver or scandium.

19. The method according to claim 1, wherein the scrap is de-oiled prior to loading the scrap onto the initial liquid metal bed.

20. The method according to claim 19, wherein the de-oiling is performed using a rotating cylindrical oven with a burner.

21. The method according to claim 1, wherein the initial liquid metal bed has a weight of less than 300% of the weight of the loaded scrap.

22. The method according to claim 21, wherein the initial liquid metal bed has a weight of less than 150% of the weight of the loaded scrap.

23. The method according to claim 1, wherein the smelting oven is an induction furnace.

24. The method according to claim 10, wherein the solid intermediate product is a remelting ingot.

25. The method according to claim 1, wherein the floating layer is quasi-static.

26. The method according to claim 1, wherein the density of the scrap is between 0.1 $t/m^3$ and 0.7 $t/m^3$.

27. A method for melting scrap of an aluminum alloy containing lithium, comprising:
   (i) providing scrap containing aluminum-lithium-type alloys;
   (ii) preparing an initial liquid metal bed of a first composition in a smelting oven;
   (iii) loading the scrap onto the initial liquid metal bed so as to create, at the surface of the liquid metal bed, a floating layer of the scrap with a controlled thickness of between 300 mm and 1500 mm, the floating layer preventing oxidation of the liquid metal bed by the ambient air, the floating layer being partially melted by contact with the metal bed so as to obtain a liquid metal bath having a second composition, which can be the same as or different from the first composition, a lithium content of the second composition of the metal bath being between 0.2 wt. % to 2.5 wt. %; and (iv) removing the liquid metal from the second composition of the liquid metal bath.

* * * * *